Patented Nov. 14, 1950

2,529,890

UNITED STATES PATENT OFFICE 2,529,890

PROCESS FOR PRODUCING ANTIHALATION PHOTOGRAPHIC ARTICLE

André Emile Van Dormael, Heverlee-Louvain, and Laurent Aloys Van der Auwera, Mortsel-Antwerp, Belgium, assignors to Gevaert Photo-Producten N. V., Mortsel-Antwerp, Belgium, a company of Belgium No Drawing. Application September 23, 1947, Serial No. 775,741. In Great Britain September 27, 1946

1 Claim. (Cl. 117—34)

This invention relates to colored photographic layers, especially to anti-halation- and filter layers and to the manufacture thereof.

It is already known to prepare hemitricarboxonoles by the following reaction:

FORMULA I

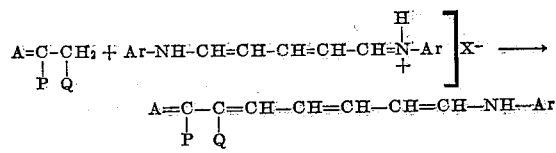

wherein
P=an organic group,
Q=an organic group,
or P and Q together=the non-metallic atoms necessary for completing a cyclic basic nucleus,
Ar=an aryl group,
A=an atom of the chalcogen group.

Hemitricarboxonoles containing an hydroxyl substitutent in the polymethine chain, however, are not known hitherto.

It is an object of the present invention to provide a new process for the manufacture of photographic layers, especially anti-halation- and filter layers.

Another object of the present invention is to provide new colored photographic layers.

Still a further object of the present invention is to provide photographic material containing a colored layer according to this invention.

Now we have found that very well colored photographic layers, especially anti-halation- or filter layers, may be obtained by coating a photographic support or layer with a solution of an aromatic amine and a compound of the general Formula II

II

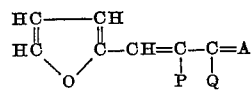

wherein
P=an organic group such as CN, COOH, carbalkoxy, acyl,
Q=an organic group such as acyl, aryl, alkylamino, arylamino, hydroxyl, alkoxyl, carboxyl, carbalkoxy,
or P and Q together=the non-metallic atoms necessary for completing a heterocyclic nucleus, occasionally having a fused-on arylene group,
A=an atom of the chalcogen group.

This reaction may be represented as follows:

III

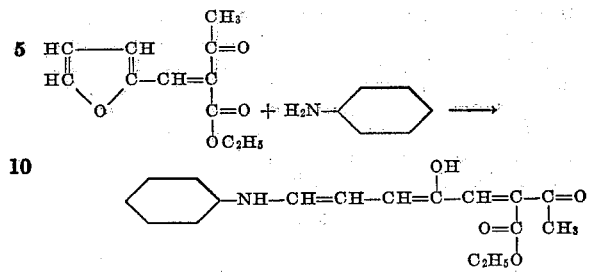

The reaction runs more easily in an acid medium.

The starting product according to the above general formula (II) may be prepared with ease from furfurol and a compound with reactive methylene group:

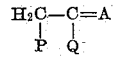

according to the known methods.

It is possible to add known anti-halation- or filter dyestuffs to the solution used for coating on a new colored photographic layer. Said solution may be incorporated in a colloid layer, or to said solution may be added a colloid binder, or it may be coated or spread without the assistance of a colloid binder.

The following examples illustrate the invention more clearly, without limiting, however, its scope.

Example 1

10 g. furfurylidene-acetyl-acetic acid ethyl ester

IV

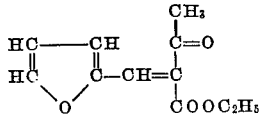

prepared from furfurol and acetyl-acetic ethyl ester according to the particulars given by E. Knoevenagel in Ber. 31 (1898) 734, dissolved in 100 cm.³ of ethyl alcohol, are treated with 7 g. anthranilic acid dissolved in 90 cm.³ ethyl alcohol, and next with 14 g. methylene-disalicylic acid in 130 cm.³ ethyl alcohol.

After spreading this solution upon the rear surface of a photographic material, an intense violet anti-halation layer with good covering power and lacquer properties is obtained. The probable formula is:

V

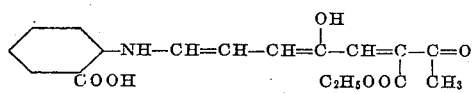

Example 2

13 g. furfurylidene-4-methyl-3-phenyl-1-pyrazolone-5

VI

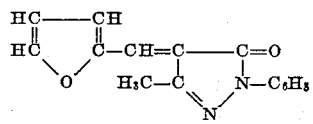

prepared from furfurol and methyl-3-phenyl-1-pyrazolone-5 according to the instructions given by J. Tambor in Ber. 33 (1900) 870, dissolved in 250 cm.³ of ethyl alcohol, are treated with 5 g. aniline in 20 cm.³ of ethyl alcohol and with 14 g. methylene-disalicylic acid in 140 cm.³ ethyl alcohol. After spreading this solution upon the rear surface of a photographic material, an intense blue anti-halation layer with good covering power and lacquer properties is obtained. The probable formula is:

VII

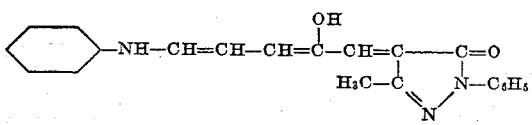

Example 3

6,5 g. furfurylidene-4-methyl-3-phenyl-1-pyrazolone-5, dissolved in 150 cm.³ ethyl alcohol, are treated with 3 g. N-methyl-aniline in 20 cm.³ alcohol and 7 g. methylene-disalicylic acid in 90 cm.³ alcohol. After spreading this solution upon a glass plate, an anti-halation layer with the same properties as in the foregoing example is obtained.

The probable formula is:

VIII

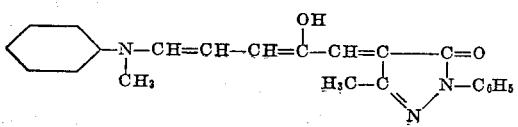

Example 4

2,4 g. furfurylidene-cyan-acetic acid anilide

IX

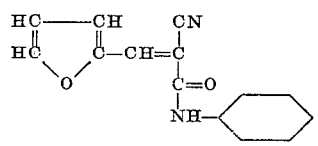

dissolved in 100 cm.³ ethyl alcohol are treated with 4.2 g. piperidine in 50 cm.³ ethyl alcohol and 2.5 g. methylene-disalicylic acid in 100 cm.³ ethyl alcohol. After spreading this solution upon a glass plate, an intense red anti-halation layer with good covering power and lacquer properties is obtained.

Probable formula according to Formula X

X

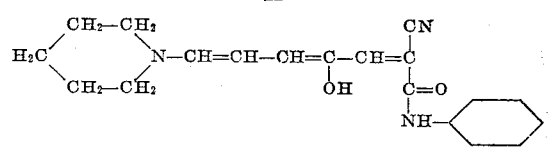

The furfurylidene-cyan-acetic acid anilide may be prepared by refluxing during 15 minutes 8 g. cyan acetic acid anilide in 120 cm.³ ethyl alcohol and 5 g. furfural.

After cooling, the reaction product is recrystallized from ethyl alcohol. Melting point: 178–179° C.

What we claim is:

A process for the manufacture of an anti-halation layer on a photographic glass plate, which comprises spreading upon the glass plate a mixture of furfurylidene-4-methyl-3-phenyl-1-pyrazolone-5 dissolved in alcohol and methylene-disalicylic acid in alcohol.

ANDRÉ EMILE VAN DORMAEL.
LAURENT ALOYS VAN DER AUWERA.

REFERENCES CITED

The following references are of record in the file of this patent:

UNITED STATES PATENTS

| Number | Name | Date |
|---|---|---|
| 1,631,421 | Lohofer | June 7, 1927 |
| 1,900,459 | Moyse | Mar. 7, 1933 |
| 1,939,171 | Hickman | Dec. 12, 1933 |
| 2,158,287 | Konig | May 16, 1939 |
| 2,186,624 | Brooker | Jan. 9, 1940 |
| 2,199,542 | Konig | May 7, 1940 |
| 2,258,609 | Hill | Oct. 14, 1941 |
| 2,322,006 | Fierke et al. | June 15, 1943 |